(12) United States Patent
Theophilis

(10) Patent No.: US 10,229,423 B2
(45) Date of Patent: *Mar. 12, 2019

(54) INTEGRATION OF A VIDEO WALL ADVERTISING UNIT WITH PUSHDOWN AND DIGITAL MEDIA CONTENT

(75) Inventor: Mark Theophilis, Jersey City, NJ (US)

(73) Assignee: VIACOM INTERNATIONAL INC., New York, NY (US)

(*) Notice: Subject to any disclaimer, the term of this patent is extended or adjusted under 35 U.S.C. 154(b) by 859 days.

This patent is subject to a terminal disclaimer.

(21) Appl. No.: 13/599,485

(22) Filed: Aug. 30, 2012

(65) Prior Publication Data
US 2014/0006156 A1   Jan. 2, 2014

Related U.S. Application Data

(60) Provisional application No. 61/666,577, filed on Jun. 29, 2012.

(51) Int. Cl.
*G06Q 30/02*   (2012.01)

(52) U.S. Cl.
CPC ......... *G06Q 30/02* (2013.01); *G06Q 30/0241* (2013.01)

(58) Field of Classification Search
CPC ..... G06Q 30/0257; G06Q 30/00; G06Q 30/02
USPC ....................... 705/14.55, 1.1, 14.64; 725/42
See application file for complete search history.

(56) References Cited

U.S. PATENT DOCUMENTS

| | | | |
|---|---|---|---|
| 2008/0010076 A1* | 1/2008 | McMahon et al. | 705/1 |
| 2008/0066107 A1* | 3/2008 | Moonka et al. | 725/42 |
| 2009/0063280 A1* | 3/2009 | Wurster et al. | 705/14 |

* cited by examiner

*Primary Examiner* — Marilyn G Macasiano
(74) *Attorney, Agent, or Firm* — Fay Kaplun & Marcin, LLP

(57) ABSTRACT

Described herein are methods, systems, and computer program products for dynamic integration and presentation of advertising content and media content. A server computing device receives a request for media content from a remote computing device. The server computing devices provides, in response to the request, an interactive advertising unit comprising a first content layer including the requested media content and a media player, a second content layer including the advertising content comprising static content and interactive content, and an integration module configured to display the requested media content in the media player, and reveal the advertising content in an area extending from a boundary of a playback window of the media player, wherein revealing the advertising content includes displacing web page content to accommodate the advertising content while keeping the web page content available for viewing and interaction.

21 Claims, 5 Drawing Sheets

INTEGRATION OF A VIDEO WALL ADVERTISING UNIT WITH PUSHDOWN AND DIGITAL MEDIA CONTENT

RELATED APPLICATION

This application claims priority to Ser. No. 61/666,577, filed on Jun. 29, 2012, the entire disclosure of which is incorporated herein by reference.

TECHNICAL FIELD

The subject matter of this application relates generally to methods and apparatuses, including computer program products, for integration of a video wall advertising unit with pushdown and digital media content.

BACKGROUND

Content providers have long sought to include advertising as part of their broadcasts in order to generate revenue and recoup the costs of content production, and manufacturers of consumer goods have placed their ads with various content providers in order to extol the virtues of their goods to the largest possible consumer audience. For example, ever since their earliest days, radio and television stations frequently have broadcast blocks of ads in between their programming segments. More recently, content providers on the Internet have utilized banner advertisements, pop-up advertisements, and other forms of interactive advertising on websites.

In order to capitalize on the recent explosion in availability of online media (e.g., streaming video feeds), content providers, consumer goods companies, and advertising firms have turned their attention to developing dynamic and interactive experiences for users who access the online media.

SUMMARY OF THE INVENTION

It would be desirable to have a method and system for dynamically integrating advertising content with media content (e.g., digital media content) to achieve the effect of linking the advertisement with the context of the digital media content, web page, and/or the embedded media player, thereby increasing the advertisement's exposure to the consumer. Also, it would be desirable in some examples to completely interrupt the desired media content in a linear fashion by displaying the advertising content first, but also providing the user with a mechanism to interact with the advertising content and view the media content. It would be desirable in some examples to present the advertising content and the digital media content in a non-linear fashion so to leave the digital media content uninterrupted and substantially unobstructed while at the same time displaying the advertising content to the user, allowing the user to enjoy the desired media content while simultaneously viewing the advertising content. Also, it would be desirable in some examples to allow the user to interact with the advertising content and/or tie the media content and the advertising content together in a unique and unanticipated way.

In general overview, the techniques described herein are related to integration of a fully interactive rich media advertising unit and media content (e.g., digital media content) presented in a media player. The techniques provide for simulated integration, creating an illusion to a user that the advertising content and digital media content are brought together in the media player. The techniques also provide for functional integration via interaction between the advertising unit and the media player, including manipulation of spatial, temporal, and control components, resulting in a unique presentation of the advertising content and digital media content to the user. Spatial integration refers to the synchronization of position and coverage between the advertising unit and the media player. Temporal integration refers to the coordination of content display timing between the advertising unit and the media player. Control integration refers to the communication between the advertising unit and the media player in transferring influence and priority of displayed content. The techniques advantageously enable dynamic and unexpected interplay between digital media content contained in an embedded media player and an interactive, persistent advertising unit configured to capture the attention of a user and offer an engaging, memorable experience.

The invention, in one aspect, features a method for dynamic integration and presentation of advertising content and media content. A server computing device receives a request for media content from a remote computing device. The server computing devices provides, in response to the request, an interactive advertising unit comprising a first content layer including the requested media content and a media player, a second content layer including the advertising content, wherein the advertising content comprises static content and interactive content, and an integration module. The integration module is configured to display the requested media content in the media player, and reveal the advertising content in an area extending from a boundary of a playback window of the media player, wherein revealing the advertising content includes displacing web page content to accommodate the advertising content while keeping the web page content available for viewing and interaction. The server computing device transmits the interactive advertising unit for presentation on the remote computing device.

The invention, in another aspect, features a system for dynamic integration and presentation of advertising content and media content. The system includes a server computing device configured to receive a request for media content from a remote computing device and provide, in response to the request, an interactive advertising unit comprising a first content layer including the requested media content and a media player, a second content layer including the advertising content, wherein the advertising content comprises static content and interactive content, an integration module. The integration module is configured to display the requested media content in the media player, and reveal the advertising content in an area extending from a boundary of a playback window of the media player, wherein revealing the advertising content includes displacing web page content to accommodate the advertising content while keeping the web page content available for viewing and interaction. The server computing device is further configured to transmit the interactive advertising unit for presentation on the remote computing device.

The invention, in another aspect, features a computer program product, tangibly embodied in a computer readable storage medium, for dynamic integration and presentation of advertising content and media content. The computer program product includes instructions operable to configure a data processing apparatus to receive a request for media content from a remote computing device and provide, in response to the request, an interactive advertising unit comprising a first content layer including the requested media content and a media player, a second content layer including the advertising content, wherein the advertising content comprises static content and interactive content, and an integration module. The integration module is configured to display the requested media content in the media player, reveal the advertising content in an area extending from a boundary of a playback window of the media player, wherein revealing the advertising content includes displacing web page content to accommodate the advertising content while keeping the web page content available for viewing and interaction. The computer program product includes further instructions operable to configure the data processing apparatus to transmit the interactive advertising unit for presentation on the remote computing device.

Any of the above aspects can include one or more of the following features. In some embodiments, the integration module is further configured to receive a request for additional media content associated with the revealed advertising content, and display the additional media content within the boundaries of the playback window of the media player. In some embodiments, revealing the advertising content occurs without user input, after a predetermined period of time, or both. In some embodiments, revealing the advertising content occurs in response to a user request. In some embodiments, revealing the advertising content is synchronized with playback of the requested media content.

In some embodiments, the integration module is further configured to conceal the revealed advertising content. In some embodiments, concealing the revealed advertising content occurs in response to a user request. In some embodiments, concealing the revealed advertising content occurs without user input, after a predetermined period of time, or both.

In some embodiments, the integration module is further configured to manage the spatial presentation of the requested media content and the advertising content, synchronize the temporal presentation of the requested media content and the advertising content, and control the presentation priority of the requested media content and the advertising content. In some embodiments, managing the spatial presentation includes positioning the advertising content over the media player so as to obscure the requested media content. In some embodiments, managing the spatial presentation includes positioning the advertising content in proximity to the media player so as to display the requested media content unobscured.

In some embodiments, the integration module displays an animation in revealing the advertising content. In some embodiments, the integration module extends the display area of the requested media content to a widescreen format. In some embodiments, the integration module displays an animation in concealing the revealed advertising content.

In some embodiments, the static content and the interactive content are related according to genre, theme, advertised product, subject matter, or any combination thereof. In some embodiments, the interactive content includes arcade games, puzzle games, trivia games, content rating applications, interactive virtual objects representative of the functionality of the advertised product, chat windows, product catalogs, or other types of interactive entertainment or communication applications.

In some embodiments, the integration module is further configured to receive input based on a user action. In some embodiments, at least one of the static content and the interactive content includes a graphical representation of an advertised product, an advertised service, or both. In some embodiments, the integration module is configured to transmit one or more commands from the second content layer to the first content layer, the one or more commands operable to control playback of the requested media content in the media player.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

In general overview, the techniques described herein are directed to methods and apparatuses, including computer program products, for dynamic integration and presentation of advertising content and media content (e.g., digital media content). As described in more detail, the advertising content is combined with the digital media content (displayed in, for example, a media player) in a seamless fashion to provide an interactive advertising unit. The creation of the interactive advertising unit provides the advantages of greatly increasing a user's exposure to the advertising content while not materially diminishing the user's consumption of the digital media content. The nature of the interactive advertising unit, displaying advertising content in proximity to requested digital media content, allows the use of a broad range of marketing techniques, such as product placement, brand association, and click-through opportunities. Thus, the techniques provide an opportunity for manufacturers to increase the effectiveness of their advertising while maintaining the accessibility and appeal of the requested digital media content.

The display of the advertising and digital media content is not limited to a web browser or traditional embedded media player. For example, the advertising content and/or video content could be displayed to a user via an interactive application downloaded and executed on a smart phone, i.e., an "app" configured to run on the iPhone® from Apple® Computer, Inc.

Figure 1:
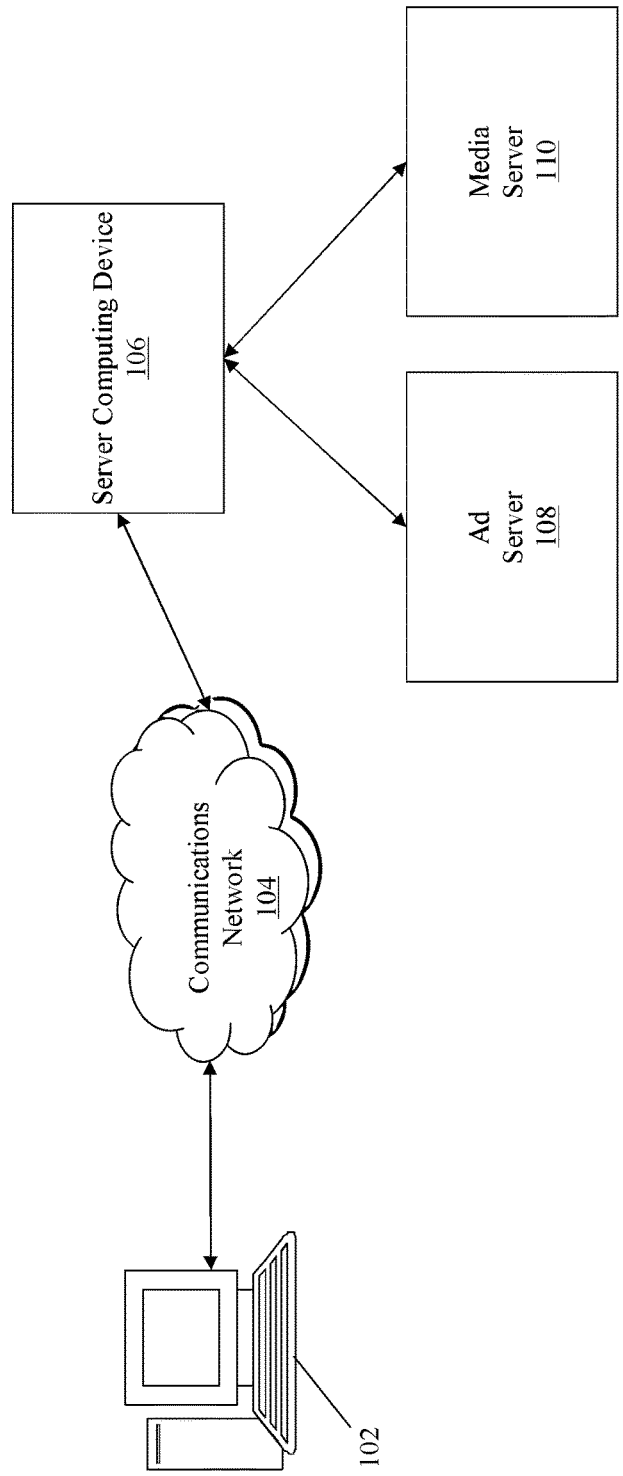
FIG. 1 is a block diagram of a system for the dynamic integration and presentation of advertising and media content.

FIG. 1 is a block diagram of a system 100 for dynamic integration and presentation of advertising and media content. The system 100 includes a client computing device 102, a communications network 104, and a server computing device 106. In some embodiments, the server computing device 106 is connected to one or more other computing devices which provide advertising content (e.g., ad server 108) and digital media content (e.g., video server 110). The server computing device 106, ad server 108, and video server 110 can reside at the same physical location or may be dispersed to multiple physical locations. The server computing device 106, ad server 108, and video server 110 can be located on the same physical device or one or more of the servers 106, 108, 110 can be distributed over many devices. The server computing device 106, ad server 108, and video server 110 can communicate via a communications network, for example communications network 104.

The client computing device 102 is the hardware that displays the interactive advertising unit containing advertising content and digital media content to a user. Example computing devices take on many forms, including but not limited to a personal computer, a tablet computer, a stand-alone video player, a home video game console, a portable video game system, a personal digital assistant (PDA), an internet appliance, a smart phone, a set-top box, or the like. The computing device 102 includes network-interface components to enable the user to connect to a communications network 104, such as the Internet. The computing device 102 also includes browser software to enable the user to interact with web sites and other content providers. Some example browser software includes Microsoft® Internet Explorer, Mozilla Firefox®, or other similar software applications. The client computing device 102 also includes digital content playback plug-ins or standalone software to enable the user to view digital media content (e.g., video and audio) received over the communications network 104. Examples of digital media content playback software includes Microsoft® Windows Media® Player, Adobe® Flash® Player, QuickTime® from Apple® Computer, Inc., and other similar applications.

The server computing device 106 hosts web pages and other similar content, and receives content requests from the client computing device 102 via the communications network 104.

The communications network 104 channels communications from the client computing device 102 to the server computing device 106. The network 104 may be a local network, such as a LAN, or a wide area network, such as the Internet or the World Wide Web.

The ad server 108 hosts advertising content for use by the server computing device 106. In some embodiments, the ad server 108 receives requests for advertising content directly from the client computing device 102 via the communications network 104. In some embodiments, the ad server 108 receives requests for advertising content from the client computing device 102 by way of the server computing device 106. Advertising content can take a variety of forms. Examples include a static banner ad, a graphical animation or an interactive, rich media application that contains graphics, animation, audio, and/or video content, such as a Flash® application.

The media server 110 hosts digital media content for use by the server computing device 106. In some embodiments, the media server 110 can receive requests for digital media content from the client computing device 102 via the communications network 104. In some embodiments, the media server 110 receives requests for advertising content from the client computing device 102 by way of the server computing device 106. The digital media content can take a variety of forms. The media content can be short-form video content, i.e., a four-minute music video. The media content can be long-form video content, i.e., a thirty-minute television program. The media content can be audio content, i.e., a radio broadcast. Other examples include user-submitted amateur video, professional television shows, motion pictures, webcasts, podcasts, music videos, or other similar content.

Figure 2:
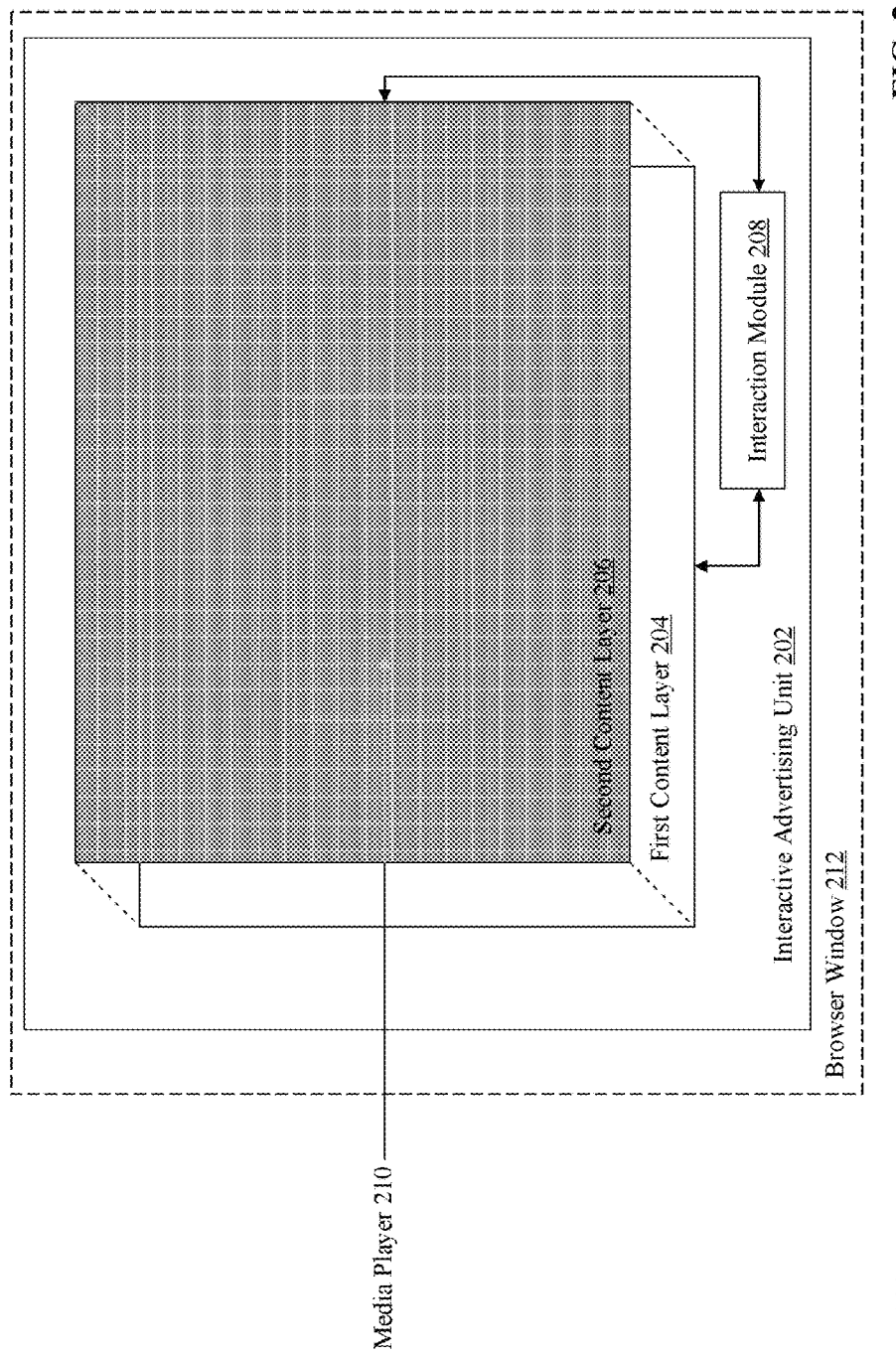
FIG. 2 is a diagram of an interactive advertising unit to display media content and advertising content.

FIG. 2 is a diagram 200 of an interactive advertising unit 202 to display media content and advertising content using the system 100 of FIG. 1.

A user interacts with the system 100 by opening a web browser 212 on the client computing device 102 and entering the address of the web server 106. The client computing device 102 sends a content request associated with the address entered by the user to the server computing device 106. Once the server computing device 106 receives the request, the server computing device 106 retrieves the requested content and transmits the content for display in the web browser 212 on the computing device 102. For example, the user can enter a standard web address, such as http://www.mtv.com/videos/, into the browser window 212 at the client computing device 102. The web server 106 can then transmit the web page located at mtv.com/videos/ to the computing device 102 for display in the browser 212.

In yet other examples, the owner of the server computing device 106 may wish to present an advertisement to the user when the user requests digital media content. As above, the user interacts with the system 100 by entering or navigating to the address of media content associated with the server computing device 106. Upon receiving the request, the server computing device 106 retrieves the requested media content (e.g., from media server 110). Before transmitting the requested media content to the computing device 102, the server computing device retrieves advertising content (e.g., from the ad server 108). In some embodiments, the advertising content is selected by the server computing device 106 based on predetermined criteria, such as a focused advertising campaign. Examples of an advertising campaign can include a predetermined number of displays of the advertising content, a predefined period of time in which the advertising content will be selected for display, a marketing association between the owner of the advertising content, the producer of the requested video content, and the like. The server computing device 106 combines the advertising content and the requested digital media content to provide an interactive advertising unit 202. The server computing device 106 transmits the interactive advertising unit 202 to the client computing device 102 for presentation to a user. The interactive advertising unit 202 presents the advertising content (e.g., from ad server 108) along with the digital media content requested by the user (e.g., from media server 110) in a number of interesting, memorable, and dynamic ways, as shown below.

In some embodiments, the server computing device 106 combines the digital media content and the advertising content into an interactive advertising unit 202 using a multi-layered approach. The server computing device 106 places the digital media content and associated media player 210 into a first content layer 204, and places the advertising content into a second content layer 206. In one embodiment, the second content layer 206 is positioned on top of the first content layer 204 of the interactive advertising unit 202. In some embodiments, the second content layer 206 is larger than the playback area of the media player. The interactive advertising unit 202 is transmitted to the client computing device 102 for display, such as in browser window 212 (e.g., embedded in a larger web page). In some embodiments, the interactive advertising unit 202 provides the second content layer 206 using the <div> tag provided by the HTML programming language, in association with Cascading Style Sheets (CSS) to coordinate presentation attributes of the <div> tag.

The interactive advertising unit 202 includes an interaction module 208 which coordinates the interactions between the content layers (e.g., first content layer 204 and second content layer 206). The interaction module 208 manages the spatial presentation, synchronizes the temporal presentation, and controls the presentation priority of the advertising content and the digital media content in the respective content layers 204 and 206. The interaction module 208 coordinates the spatial, temporal, and control functionality to work in concert with each other, advantageously merging the features of each presentation type.

Management of the spatial relationship between the digital media content and the media player in the first content layer 204, and the advertising content in the second content layer 206, is important to providing an engaging and dynamic experience to the user. In one embodiment, the interaction module 208 of the interactive advertising unit 202 positions the second content layer 206 in certain areas above the first content layer 204, thereby enabling the strategic placement of the advertising content in an area that catches the user's attention while keeping the digital media content in the first content layer 204 unobstructed and available for viewing. In another embodiment, the interaction module 208 of the interactive advertising unit 202 positions the second content layer 206 in certain areas above the first content layer 204 in a way that masks or obscures the digital media content in the first content layer 204. In this embodiment, the interaction module 208 leverages the masking of the digital media content to emphasize the advertising content or to reveal the digital media content to the user in a dramatic and unexpected way. In any of these embodiments, the second content layer 206 can be partially or fully transparent until the interactive advertising unit 202 displays the advertising content.

Synchronization of the temporal relationship between the digital media content and the media player in the first content layer 204, and the advertising content in the second content layer 206, is also important to achieving a unique and unexpected user experience. In one embodiment, the interaction module 208 displays advertising content (e.g., a pre-roll video, a pop-up ad) before presentation of the digital media content to assist the user in making a "connection" between the advertised goods and the media content, and thereby increasing the user's anticipation of and engagement in the content.

In addition, control of the presentation priority between the digital media content in the first content layer 204, and the advertising content in the second content layer 206, is important for augmenting the interactive functionality of the interactive advertising unit 202 to increase user interest in and appeal of the presented content. In one embodiment, the interaction module 208 of the interactive advertising unit 202 displays the advertising content until the module 208 receives a user input request to skip the advertising content and begin displaying the requested digital media content in the media player 210, thereby inducing the user to interact with the advertising content and maximizing exposure for the advertised goods. In another embodiment, the interaction module 208 of the interactive advertising unit 202 displays the advertising content until the content has completed its playback then transitions to displaying the requested digital media content in an unexpected way. In this embodiment, the interaction module 208 integrates the display of the advertising content seamlessly into the overall presentation to enable advertising opportunities that are dynamic and interesting.

Although shown as covering almost the entire browser window 212, the content layers 204 and 206 of the interactive advertising unit 202 can vary in size and cover any portion of the browser window 212. In some embodiments, the interactive advertising unit 202 includes multiple content layers, in addition to the first and second content layers 204 and 206. In one embodiment, the interactive advertising unit 202 places one content layer (e.g., second content layer 206) above a media player 210 contained in another content layer (e.g., first content layer 204), while the interactive advertising unit 202 can place another separate content layer (not shown) above a different section of the browser window 212, such as above the top portion or in a side margin. The interaction module 208 of the interactive advertising unit 202 coordinates the spatial presentation management, temporal presentation synchronization, and the presentation priority control of the content residing in each of the provided content layers (e.g., layers 204 and 206). In one embodiment, the interaction module 208 uses a protocol such as LocalConnections provided in the Adobe Flash® development tool to communicate between the respective content layers (e.g., layers 204 and 206).

Figure 3A:
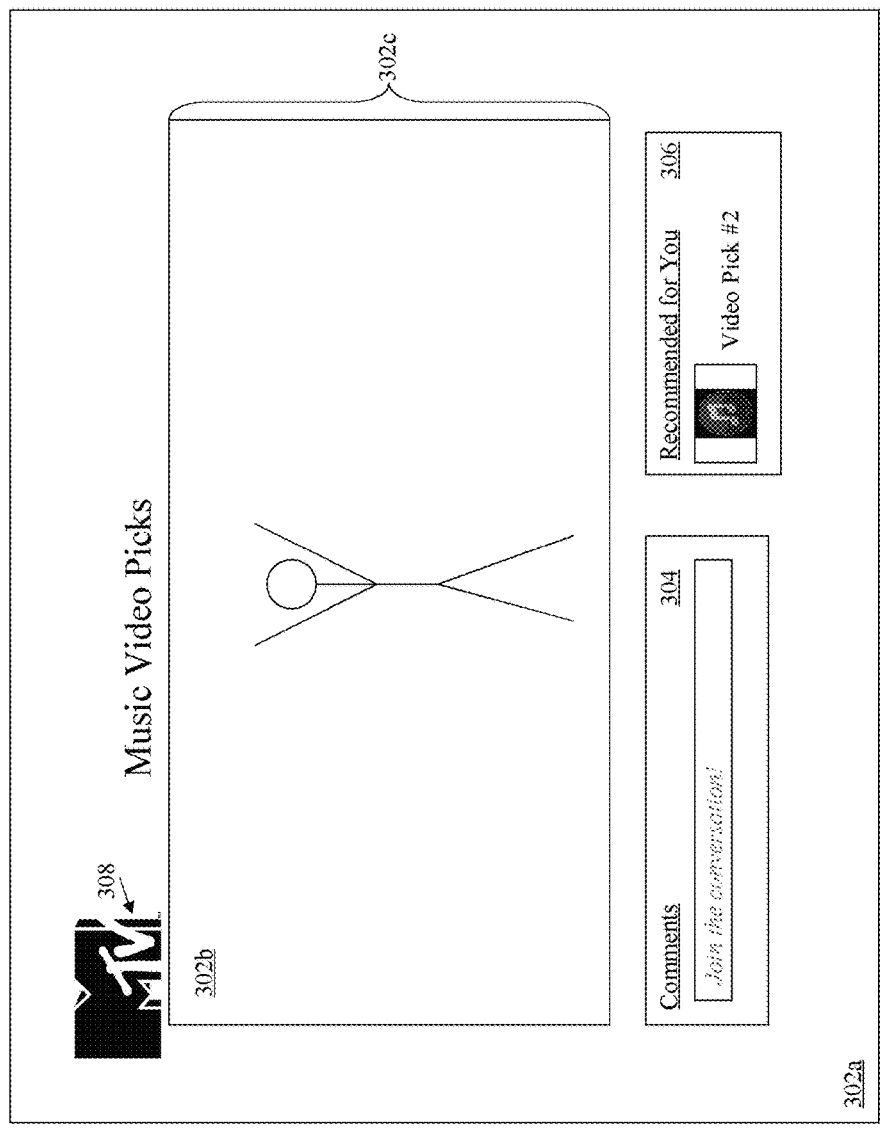
FIGS. 3A-3C are screenshots of an exemplary embodiment of a video wall interactive advertising unit with pushdown provided by the system and integrated with digital media content.
Figure 3B:
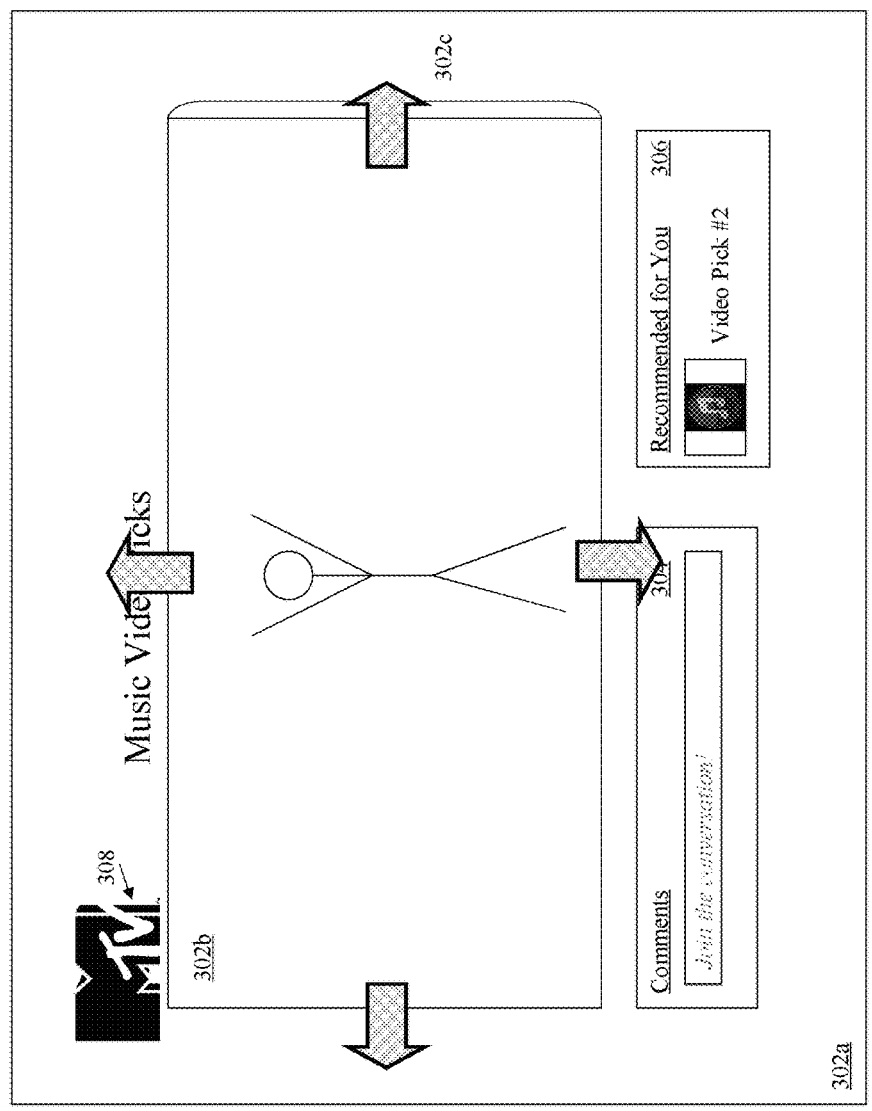

FIGS. 3A-3B are screenshots of an exemplary embodiment of an interactive advertising unit (e.g., interactive advertising unit 302c) provided by the system 100, wherein the advertising unit 302c includes an interactive video wall content area integrated with digital media content.

When a user at a client computing device (e.g., client computing device 102) navigates to a web page that hosts the desired digital media content, the server computing device 106 receives the request and retrieves the requested media content (e.g., from video server 110) and advertising content (e.g., from ad server 108). The server computing device 106 combines the advertising content and the digital media content to provide an interactive advertising unit. The interactive advertising unit places the advertising content into the second content layer, and places the digital media content in the first content layer which includes the media player 302b (e.g., in a browser window 302a).

In this embodiment, the second content layer covers the entire playback area of the media player 302b in the first content layer. The interactive advertising unit initiates display of the advertising content. The other elements on the web page (e.g., comments area 304, recommended video links area 306, logo 308, etc.) are not hidden from view or obscured. The user is able to view and interact freely with these other elements during display of the advertising content.

At the same time as (or shortly after) display of the advertising content is initiated, the interaction module of the interactive advertising unit 302c (as shown in FIG. 3B) expands the display area of the advertising content in a visually stimulating and unexpected manner. Referring to FIG. 3B, the interactive advertising unit 302c expands the display area of the advertising content by moving (or pushing) the web page content (e.g., comments area 304, recommended video links area 306, and logo 308) located adjacent to the media player 302b to provide space for the expanded advertising display area. The arrows in FIG. 3B indicate the expansion of the advertising display area. In some embodiments, the interactive advertising unit 302c expands the advertising display area automatically (i.e., without receipt of any user input). In some embodiments, the interactive advertising unit 302c can expand the advertising display area after receiving a command or other input (e.g., a mouse click, a mouse-over) from the user.

In some embodiments, the interactive advertising unit 302c displays a trigger or similar interactive feature (not shown) within the borders of the playback window of the media player 302b. As the interactive advertising unit 302c begins to display the advertising content, the interactive advertising unit 302c places the trigger on top of the advertising content so that the trigger is visible to the user. The trigger can be semi-transparent so as to limit obstruction of the advertising content. The user interacts with the trigger, and the interactive advertising unit 302c responds by expanding the advertising display area.

Figure 3C:
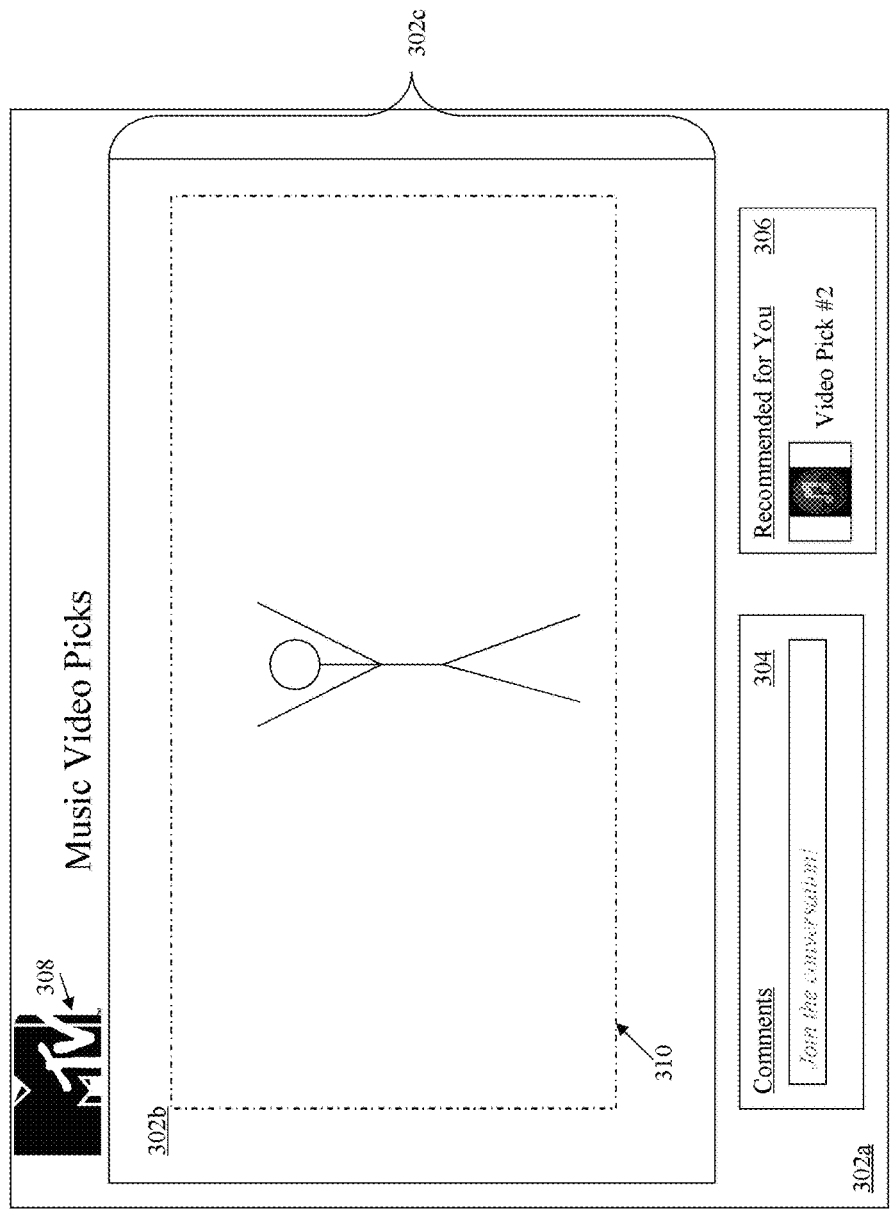

As shown in FIG. 3C, the interactive advertising unit 302c has completed the expansion of the advertising display area, and the advertising display area covers a larger portion of the web page. The box with dashed lines 310 in FIG. 3C represents the original size of the advertising display area before expansion. The expansion results in the comments area 304, recommended video links area 306, and logo 308 having been moved or pushed on the web page to accommodate the larger size of the advertising display area. For example, the comments area 304 and the recommended video links area 306 have been pushed down on the web page. In some embodiments, movement of the other web page elements 304, 306, 308 results in a portion or all of the elements to be outside of the current viewing area of the web page and the user scrolls up or down on the page to view the elements. Each of the comments area 304, recommended video links area 306, and logo 308 are still available on the web page, and the user is still able to interact with the elements 304, 306, and 308 (e.g., adding his comment, clicking on a recommended video link, etc.).

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, DVD-ROM, and/or BluRay disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, smart phone, laptop computer, tablet computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation, Chrome available from Google, Inc.). The mobile computing device includes, for example, a Blackberry®, an iPhone®, and/or an Android™-based device.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for dynamic integration and presentation of advertising content and media content, the method comprising:
    receiving, by a server computing device, a request for media content from a remote computing device;
    providing, by the server computing device in response to the request, an interactive advertising unit comprising:
        a first content layer including the requested media content and a media player;
        a second content layer including the advertising content, wherein the advertising content comprises static content and interactive content, wherein the second content layer is separate from the first content layer; and
        an integration module configured to:
            display the requested media content in the media player; and
            operate on the remote computing device to combine the first content layer and the second content layer to reveal the advertising content in an area extending from a boundary of a playback window of the media player, wherein revealing the advertising content includes displacing web page content to accommodate the advertising content while keeping the web page content available for viewing and interaction; and
    transmitting, by the server computing device, the interactive advertising unit for presentation on the remote computing device.

2. The method of claim 1, the integration module further configured to:
    receive a request for additional media content associated with the revealed advertising content; and
    display the additional media content within the boundaries of the playback window of the media player.

3. The method of claim 1, wherein revealing the advertising content occurs without user input, after a predetermined period of time, or both.

4. The method of claim 1, wherein revealing the advertising content occurs in response to a user request.

5. The method of claim 1, wherein revealing the advertising content is synchronized with playback of the requested media content.

6. The method of claim 1, the integration module further configured to conceal the revealed advertising content.

7. The method of claim 6, wherein concealing the revealed advertising content occurs in response to a user request.

8. The method of claim 6, wherein concealing the revealed advertising content occurs without user input, after a predetermined period of time, or both.

9. The method of claim 1, the integration module further configured to:
    manage the spatial presentation of the requested media content and the advertising content;
    synchronize the temporal presentation of the requested media content and the advertising content; and
    control the presentation priority of the requested media content and the advertising content.

10. The method of claim 9, wherein managing the spatial presentation includes positioning the advertising content over the media player so as to obscure the requested media content.

11. The method of claim 9, wherein managing the spatial presentation includes positioning the advertising content in proximity to the media player so as to display the requested media content unobscured.

12. The method of claim 1, wherein the integration module displays an animation in revealing the advertising content.

13. The method of claim 1, wherein the integration module extends the display area of the requested media content to a widescreen format.

14. The method of claim 1, wherein the integration module displays an animation in concealing the revealed advertising content.

15. The method of claim 1, wherein the static content and the interactive content are related according to genre, theme, advertised product, subject matter, or any combination thereof.

16. The method of claim 1, wherein the interactive content includes arcade games, puzzle games, trivia games, content rating applications, interactive virtual objects representative of the functionality of the advertised product, chat windows, product catalogs, or other types of interactive entertainment or communication applications.

17. The method of claim 1, the integration module further configured to receive input based on a user action.

18. The method of claim 1, wherein at least one of the static content and the interactive content includes a graphical representation of an advertised product, an advertised service, or both.

19. The method of claim 1, wherein the integration module is configured to transmit one or more commands from the second content layer to the first content layer, the one or more commands operable to control playback of the requested media content in the media player.

20. A system for dynamic integration and presentation of advertising content and media content, the system comprising:
    a server computing device configured to:

receive a request for media content from a remote computing device;

provide, in response to the request, an interactive advertising unit comprising:
- a first content layer including the requested media content and a media player;
- a second content layer including the advertising content, wherein the advertising content comprises static content and interactive content, wherein the second content layer is separate from the first content layer; and
- an integration module configured to:
  - display the requested media content in the media player; and
  - operate on the remote computing device to combine the first content layer and the second content layer to reveal the advertising content in an area extending from a boundary of a playback window of the media player, wherein revealing the advertising content includes displacing web page content to accommodate the advertising content while keeping the web page content available for viewing and interaction; and transmit the interactive advertising unit for presentation on the remote computing device.

21. A non-transitory computer readable storage medium, for dynamic integration and presentation of advertising content and media content storing a set of instructions operable to configure a data processing apparatus to:

receive a request for media content from a remote computing device;

provide, in response to the request, an interactive advertising unit comprising:
- a first content layer including the requested media content and a media player;
- a second content layer including the advertising content, wherein the advertising content comprises static content and interactive content, wherein the second content layer is separate from the first content layer; and
- an integration module configured to:
  - display the requested media content in the media player; and
  - operate on the remote computing device to combine the first content layer and the second content layer to reveal the advertising content in an area extending from a boundary of a playback window of the media player, wherein revealing the advertising content includes displacing web page content to accommodate the advertising content while keeping the web page content available for viewing and interaction; and transmit the interactive advertising unit for presentation on the remote computing device.

* * * * *